United States Patent [19]

Weaver et al.

[11] 3,777,820

[45] Dec. 11, 1973

[54] LPG INJECTION WITH SURFACTANT FOR RELIEVING PERMEABILITY BLOCKING

[75] Inventors: Clarence W. Weaver, Houston; Robert R. Scroggins, Midland, both of Tex.

[73] Assignee: Allied Chemical Corporation, New York, N.Y.

[22] Filed: Aug. 17, 1972

[21] Appl. No.: 281,599

Related U.S. Application Data

[63] Continuation of Ser. No. 87,323, Nov. 5, 1970, abandoned.

[52] U.S. Cl.............................. 166/305 R, 166/304
[51] Int. Cl............................................ E21b 43/16
[58] Field of Search.......................... 339/304, 305 R

[56] References Cited

UNITED STATES PATENTS

| 2,356,254 | 8/1944 | Lehmann, Jr. et al.............. | 166/304 |
| 3,241,614 | 3/1966 | Bertness............................... | 166/304 |
| 3,477,513 | 11/1969 | Ferguson ............................ | 166/304 |
| 3,718,586 | 2/1973 | Rollo et al. .......................... | 166/304 |

*Primary Examiner*—Joseph H. McGlynn
*Attorney*—Jonathan Plaut

[57] ABSTRACT

Introduction of mixture of LPG and surfactant for relieving blocking of well.

3 Claims, No Drawings

LPG INJECTION WITH SURFACTANT FOR RELIEVING PERMEABILITY BLOCKING

This application is a continuation of Ser. No. 87,323, filed Nov. 5, 1970, and now abandoned.

BACKGROUND OF THE INVENTION

This invention relates to an improved method of releasing the hydrocarbon fluids in a well formation into the well bore by the alleviation of a permeability block. Such blocks, which may be caused by the introduction of various acids into the well formation, for example, may be in the form of water wet acid fines and acid-emulsion blocks or emulsions, or water oil blocks. These permeability blocks can greatly reduce the capacity of the well to produce hydrocarbon fluids in place and in many instances they have completely blocked the flow of hydrocarbon fluids to the well bore.

My invention resides in a method of removing a permeability block thereby releasing production in a hydrocarbon fluid containing formation by injecting into the "blocked" formation a mixture of $C_3$ and $C_4$ (propane and butane) solvents further mixed with a special de-emulsifier and surfactant solvent, called a surfactant, all being compatible with oil or gas producing reservoirs without causing further damage. The particular deemulsifier and surfactant solvent preferred is a mixture of ethylene glycol and butyl ether, from about 1 percent to about 5 percent in the $C_3 - C_4$ mixture and preferably from about 2 percent to about 3 percent, as will be discussed later. The operation of my invention requires that the above mixture be soluble in reservoir crude oil or gases. When the mixture enters the well bore at sufficient pressures and rates so as not to produce fractures, the soluble solution will penetrate the formation out from the well bore and clean and de-emulsify thus breaking the permeability bonds and restoring the passages to the previously trapped hydrocarbons, thereby pressuring the formation until a "break" occurs, allowing flow. The preferred practice, after injection, is to shut the well in for a period of 12 to 24 hours to allow the injected fluids to further permeate the formation.

In a well bore penetrating a hydrocarbon-containing formation which is blocked, the well may be cased by setting a pipe through the hydrocarbon-containing formation, or by performing an open hole completion through the producing zone. In either completion method the tubular pipe is bonded to the formation and earth by cementing, which is a readily acceptable practice in the art. When the pipe is set through the formation producing zone, the hydrocarbon fluids in the formation are provided access to the well bore by openings produced by perforating, slotting or other acceptable methods. Production tubing of a smaller diameter than the rigidly held casing is installed through the casing to a point adjacent to the hydrocarbon-containing formation.

A high gravity, low viscosity liquid (a mixture of $C_3 - C_4$ and the surfactant), which is compatible and soluble to the fluid in the formation, is pumped down the tubing through the openings in one embodiment (or in another embodiment, for example, through the casing) and into the hydrocarbon-containing formation. The rate of injection and the volume of the liquid is sufficiently maintained so that no additional fractures to the formation matrix is experienced in the producing formation. The rate and volume are determined by calculating the overburden pressures required to fracture the formation matrix and will vary from well to well.

Sufficient volume of the high viscosity de-emulsifying liquid are injected until the injected liquid reaches a point calculated to be beyond the permeability block volumes. These volumes can be readily determined by using the known quantities of the product injected which caused or created the permeability block and the depth of the producing formation, porosity, permeability and the like. As the mixture enters the area of the permeability block it begins to occupy the pore spaces deserted by the displaced blocking material (such as emulsion droplets). During this entry, the formation fluids are being joined by the solvent mixture, breaking down the bond which caused the impermeable block.

After the injection is completed and sufficient volumes of the solvent mixture are displaced into the hydrocarbon bearing formation, the well is preferably shut in for a period of about 12 to about 24 hours to allow the injected solvent to further mix with the fliuds in the formation. Thus, by virtue of the solvent injection, the formation fluids will then contain high energy, high gravity, low viscosity droplets, thereby allowing the natural formation pressures to flow the product to the well bore at opening of the well.

The method of well bore cleaning of permeability blocks caused by the introduction of foreign fluids such as hydrogen chloride (HCl) and water mixtures, natural crude residue blocks and the like requires a high gravity, low viscosity, de-emulsifying solvent having a vapor pressure of not less than 5 psig at 100°F. and not more than 170 psig at 100°F. The solvent mixture must be totally compatible and soluble to the formation oils and it must be compatible as not to precipitate solids when it is mixed in the formation.

The preferred solvent mixture is a hydrocarbon in the range of about 70:30 to 50:50 ratio of $C_3$ to $C_4$, further mixed with a percentage ratio by volume of about 1 to 5 percent in the total mixture and preferably 2 to 3 percent compatible solvent that will act as a friction reducing agent and de-emulsifier. As stated, a mixture of ethylene glycol and butyl ether (specified gravity 0.091 and density 7.51 pound/gal.) marketed, for example, under the brand name of Corexit 7610 well stimulant (Humble) may be employed as the surfactant. The surfactant will act as a sand wetting agent and de-emulsifier. The $C_3 - C_4$ combination used in combination with surfactant allows (1) for the spreading of the surfactant through the formation area, (2) the provision of energy to return it, and (3) the leaching of hydrocarbons such as paraffin in addition to the action of the surfactant. In other words, the $C_3 - C_4$ combination works in combination with and in cooperation with the surfactant which is mixed with it. For further reference to the action of the $C_3 - C_4$ mixture alone, reference should be had to U.S. Pat. No. 3,477,513. This method is adaptable to any hydrocarbon producing reservoir that is being limited by well bore damage from residues or permeability blocks from foreign or previous injections and the like.

The optimum amount of the above described solvent mixture is a function of reservoir parameters and as thickness, permeability, porosity and the like, all of which are generally determined at the well site. The solvent mixture may be displaced by a low weight gaseous solvent, such as propane.

In one specific example of the invention, Bynum well No. 1 in West Texas (an oil producing well) was treated with about 60% $C_4$ and about 40% $C_3$ thoroughly mixed with 3 percent ethylene glycol - butyl ether surfactant of the specific gravity and density already given. Before treatment the well was producing at the rate of 10 barrels oil/day flowing. The well had previously been blocked by a 12,000 gallon acid job. The $C_3 - C_4$ surfactant mixture was pumped at 1 barrel/minute at a pressure of 2,500 pounds and displaced with 100 percent propane. 5,000 gallons of the mixture was so displaced. The well was shut in for 24 hours. It was then opened and flowed at a rate of 130 barrels a day of oil.

Although specific details have been given in the description above, it is intended that the invention only be limited by the following claims.

We claim:

1. Method of unblocking formations comprising introducing a mixture of only propane, butane, and surfactant into the formation, the surfactant comprising ethylene glycol and butyl ether and making up from abut 1 percent to about 5 percent of the total mixture, by volume, said mixture being introduced at a pressure sufficient to overcome the well pressure but not sufficient to fracture the formation, holding the well under said pressure, and removing said mixture from the well with the dissolved particles from the well.

2. Method as set forth in claim 1, the surfactant having a specific gravity of about 0.9 and a density of about 7.51 pounds/gallon.

3. Method as set forth in claim 1, the propane and butane being in the range of 70:30 to 50:50 of the total of the two ingredients and the surfactant making up from about 2 percent to about 3 percent of the total mixture, by volume.

* * * * *

UNITED STATES PATENT OFFICE
CERTIFICATE OF CORRECTION

Patent No. 3,777,820  Dated December 11, 1973

Inventor(s) Clarence W. Weaver and Robert R. Scroggins

It is certified that error appears in the above-identified patent and that said Letters Patent are hereby corrected as shown below:

Column 2, line 21, "fliuds" should be --fluids--.

Column 2, line 43, "specified" should be --specific--.

Column 2, line 43, "0.091" should be --.901--.

Signed and sealed this 16th day of July 1974.

(SEAL)
Attest:

McCOY M. GIBSON, JR.  C. MARSHALL DANN
Attesting Officer  Commissioner of Patents